United States Patent
Bello et al.

(10) Patent No.: US 9,697,068 B2
(45) Date of Patent: Jul. 4, 2017

(54) BUILDING AN INTELLIGENT, SCALABLE SYSTEM DUMP FACILITY

(71) Applicant: International Business Machines Corporation, Armonk, NY (US)

(72) Inventors: Adekunle Bello, Pflugerville, TX (US); Douglas Griffith, Georgetown, TX (US); Angela A. Jaehde, Austin, TX (US); Robert S. Manning, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 14/573,084

(22) Filed: Dec. 17, 2014

(65) Prior Publication Data

US 2016/0132381 A1 May 12, 2016

Related U.S. Application Data

(63) Continuation of application No. 14/535,366, filed on Nov. 7, 2014, now Pat. No. 9,442,791.

(51) Int. Cl.
*G06F 11/07* (2006.01)

(52) U.S. Cl.
CPC ...... *G06F 11/0778* (2013.01); *G06F 11/0709* (2013.01); *G06F 11/0748* (2013.01); *G06F 11/0751* (2013.01)

(58) Field of Classification Search
CPC ............. G06F 11/0712; G06F 11/0787; G06F 11/0778; G06F 11/0709; G06F 11/0751;
(Continued)

(56) References Cited

U.S. PATENT DOCUMENTS 6,430,707 B1 * 8/2002 Matthews ............. G06F 11/366
710/11
7,509,521 B2 3/2009 Iwakura et al.
(Continued)

FOREIGN PATENT DOCUMENTS

JP 03255547 A 11/1991

OTHER PUBLICATIONS

IBM: List of IBM Patents or Patent Applications Treated as Related (Appendix P).
(Continued)

*Primary Examiner* — Nadeem Iqbal
(74) *Attorney, Agent, or Firm* — Teddi E. Maranzano

(57) ABSTRACT

A method for building a scalable system dump facility is provided. The method includes loading a component into system memory. The component includes a plurality of program modules. A component text range table entry is created for each component, whereby the component text range table entry includes: an address range, a component identifier, a data collection function, and a link to one or more related components. Upon invoking a system dump facility, a failing function instruction is determined, based on an address of the failing instruction. The component text range table is searched for an address of a failing function that is in the address range. Memory regions that are associated with the address range are transferred to a storage device first. Memory regions that are associated with related components are transferred next. Remaining memory regions are then transferred.

6 Claims, 6 Drawing Sheets

(58) Field of Classification Search
CPC ............... G06F 11/079; G06F 11/0793; G06F 11/0715; G06F 11/3636; G06F 11/3692; G06F 11/3065

See application file for complete search history.

(56) References Cited

U.S. PATENT DOCUMENTS

| | | | |
|---|---|---|---|
| 7,882,223 B2* | 2/2011 | Brahmavar | G06F 11/0709 709/212 |
| 7,979,749 B2* | 7/2011 | Jann | G06F 11/0712 709/223 |
| 8,239,167 B2* | 8/2012 | Ramacher | G06F 11/0748 702/183 |
| 8,549,359 B2 | 10/2013 | Zheng | |
| 9,037,922 B1* | 5/2015 | Cabrera | G06F 11/07 714/47.1 |
| 2005/0228960 A1 | 10/2005 | Francis et al. | |
| 2009/0063651 A1* | 3/2009 | Brahmavar | G06F 11/0709 709/212 |
| 2009/0164851 A1 | 6/2009 | Agha et al. | |
| 2009/0216967 A1 | 8/2009 | Sugawara | |
| 2011/0225458 A1 | 9/2011 | Zuo et al. | |
| 2011/0246434 A1 | 10/2011 | Cheenath et al. | |
| 2011/0276610 A1* | 11/2011 | Hossain | G06F 17/30607 707/813 |
| 2012/0144374 A1 | 6/2012 | Gallagher et al. | |
| 2012/0304015 A1* | 11/2012 | Devegowda | G06F 11/079 714/38.11 |
| 2016/0132381 A1* | 5/2016 | Bello | G06F 11/0778 714/45 |

OTHER PUBLICATIONS

Rocha et al., "Lucy in the Sky without Diamonds: Stealing Confidential Data in the Cloud", In Proceedings of the the 1st International Workshop on Dependability of Clouds, Data Centers and Virtual Computing Environments (DCDV, with DSN'11), Hong Kong, Jun. 2011.

Poisel et al., "Evidence and Cloud Computing: The Virtual Machine Introspection Approach", Journal of Wireless Mobile Networks, Ubiquitous Computing, and Dependable Applications, vol. 4, No. 1, pp. 135-152.

Pending U.S. Appl. No. 14/535,366, entitled "Building an Intelligent, Scalable System Dump Facility", filed Nov. 7, 2014.

* cited by examiner

```
pvthread+1046000 STACK:
[04385E64]04385E64 ()
[0437CE58]0437CE58 ()
[043845E4]043845E4 ()
[0437EF44]0437EF44 ()
[041C251C]hd_start_10_2+0001B0 (??)
[041D52DC]hd_strategy+0000D8 (??)
[000EF478]std_devstrat+000270 (??)         ─110
[000EF77D0]devstrat+00004C (??)
[002C0484]j2PagerStrategy+000184 (??)
[00125DA8]jv_pdtsio_common+000444 (??, ??, ??, ??, ??, ??, ??, ??, ??, ??,
[001264AC]jv_pfsiox+000184 (??)
[002E98BC].backt+000098 (??, ??, ??, ??, ??, ??, ??, ??, ??, ??, ??, ??, ??, ??, ??,
??, ??)
[54E7801EE8CE0004]54E7801EE8CE0004 ()
[kdb_get_memory] no real storage @ 60000000E9D00010
```

100

```
component_text_range ─152     ─154
                   [000EF000, 000EF900, specfs_id, specfs_cdt_func],
                   [00120000, 00140000, vmm_id, vmm_cdt_func],
                   [002C0000, 002D0000, j2_id, j2_cdt_func],
                   [041B0000, 041F0000, lvm_id, lvm_cdt_func],
                   ...
```

BUILDING AN INTELLIGENT, SCALABLE SYSTEM DUMP FACILITY

CROSS REFERENCE

The present application is a continuation of and claims priority under 35 U.S.C. §120 of U.S. patent application Ser. No. 14/535,366, filed on Nov. 7, 2014, which is incorporated by reference in its entirety.

FIELD OF THE INVENTION

This disclosure relates generally to computer systems, and more particularly to building an intelligent and scalable system dump facility.

BACKGROUND

A system dump consists of the contents of the system memory regions that are in use in a computer at a given point in time. The system dump includes the program states of applications that were executing at the time. The operating system control structures, such as page tables, status flags, control registers, program counter and stack pointer are also captured in the system dump. Analyzing a catastrophic system or application failure is the most common purpose for creating a system dump. After its creation, the system dump is typically written to a non-volatile data file for further analysis to determine the root cause of the failure. Further, system activity is suspended and recovery is not begun until the transfer of the system dump to the data file is complete. Since system memory sizes of "3" terabytes (TB) are common in enterprise-class computer systems, collecting the system dump data becomes time consuming in view of increasingly strict system availability requirements, as may be set by service level agreements. Consequently, system administrators may be encouraged to either prematurely abort system dump data collection, or to forego it altogether, rather than extend the duration of the system outage.

SUMMARY

According to one embodiment, a method for building a scalable system dump facility is provided. The method includes: loading a component into system memory, whereby the component includes a plurality of program modules; creating a component text range table entry for each component, whereby the component text range table entry comprises: an address range, a component identifier, a data collection function, and a link to one or more related components; responsive to invoking a system dump facility, determining a failing function, based on an address of a failing instruction; searching the component text range table for an entry, whereby the address of the failing function is in the address range; and transferring first number of memory regions associated with the address range to a storage device.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 1B illustrates exemplary output from a system dump according to various embodiments of the disclosure.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer systems, and more particularly to building an intelligent and scalable system dump facility. The following described exemplary embodiments provide a system, method and program product to reduce the time required to collect diagnostic information upon a catastrophic system failure, thereby reducing the time to collect the data required for root cause analysis.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1A:
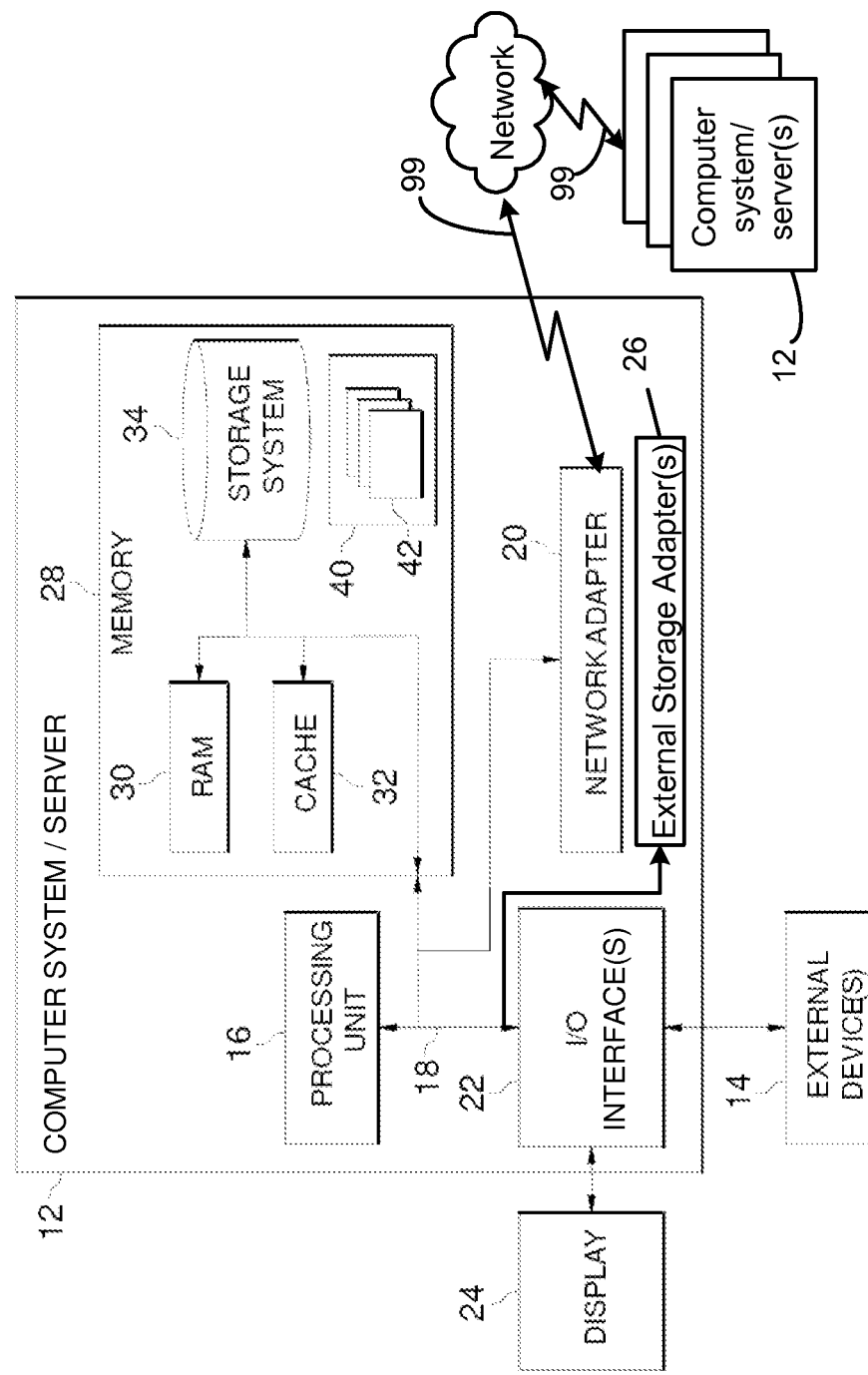
FIG. 1A illustrates an exemplary computing node operable for various embodiments of the disclosure.

Turning now to FIG. 1A, a block diagram of an exemplary computer system (server) 12 operable for various embodiments of the disclosure is presented. As shown, the server 12 is only one example of a suitable computer for executing the program instructions for selecting and prioritizing memory regions during system dump generation, and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithms of FIGS. 2-4.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1A, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. External storage adapter 26 connects the server 12 with external storage subsystems, such as a storage area network (SAN) or RAID array. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

As shown, FIG. 1B illustrates exemplary system trace 100 output from a system dump, and an excerpt from the associated component look-up table 150, according to various embodiments of the disclosure. A well-known system debugger, such as the kernel debugger (KDB), may be invoked to generate the illustrated output from the system dump file. Server 12 (FIG. 1A) memory is divided into platform dependent segments, also referred to as regions. Various control structures in both the server 12 (FIG. 1A) and the OS 40 (FIG. 1A) track the properties associated with each memory region, including: which executables are using the memory region; the process which owns the memory region; and which processes are authorized to access the memory region. In normal operation, when a process begins execution, the OS 40 (FIG. 1A) allocates a platform dependent unit of memory, for example a frame of real memory, to store the execution environment of the process. The execution environment may include, among other things: the address in memory where the process was loaded; variables and parameters used in the process; and values assigned to the variables and parameters. For each subsequent process that begins execution, such as when a process transfers control to another process, the memory allocation and execution environment storing operations are repeated. Each line in the system trace 100, including each of the two lines in entry 110, represent a unit of memory into which the OS 40 (FIG. 1A) has stored the execution environment of an executing process.

As previously described with reference to FIG. 1A, the program modules 42 of the OS 40 may be grouped by function according to the server 12 (FIG. 1A) component that the program modules 42 control. Following several preliminary low-level operations to prepare the server 12 (FIG. 1A) hardware for further initialization, the OS 40 (FIG. 1A) receives control and completes the startup, i.e., boot, process by loading into memory 28 (FIG. 1A) and starting the background processes, such as the scheduler, system logger, and networking, for the server 12 (FIG. 1A) to run. In computing, a process is an instance of an executing program. Each process performs work on behalf of the component to which it belongs. As each component is loaded into memory 28 (FIG. 1A), the OS 40 (FIG. 1A) creates an entry for it in the component look-up table 150, here referred to as the component_text_range 152 table. The component_text_range 152 table may be located in pinned memory, i.e., memory that cannot be swapped out to secondary storage, thus ensuring its continued availability to the OS 40 (FIG. 1A). A well-known system debugger, such as KDB, may be invoked to inspect the system dump file and extract the system trace 100 output, and the component_text_range 152 table, as needed, to determine a root cause of a system failure.

As will be discussed in more detail with reference to FIG. 2, the functions std_devstrat (at address 000EF478) and devstrat (000EF7D0) appear in the system trace 100 output as entry 110. Inspection of the component_text_range 152 table shows that these functions belong to the specfs_id component, as shown by a comparison of the addresses in the entry 154 for the component specfs_id (i.e., 000EF000-000EF900).

Figure 2:
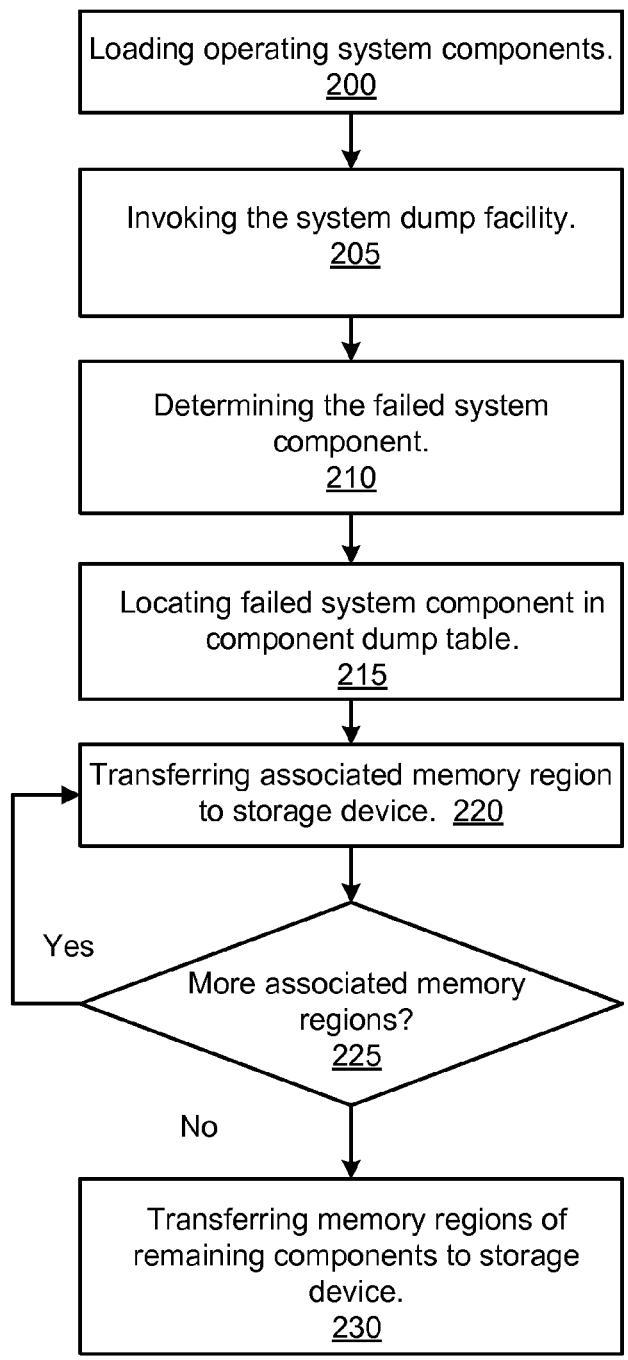
FIG. 2 is an operational flowchart illustrating an algorithm for a scalable system dump, according to various embodiments of the disclosure.

FIG. 2 illustrates an operational flowchart for an algorithm for a scalable system dump is illustrated. As previously discussed with reference to FIGS. 1A and 1B, the program modules 42 (FIG. 1A) of the OS 40 (FIG. 1A) may be grouped by function according to the component in the server 12 (FIG. 1A) that the program modules 42 (FIG. 1A) control. Each component, for example logical volume manager (LVM) registers a dump handler that is invoked if a system dump is requested. Further, a vendor of a third party product, such as for customer relationship management (CRM) or for human resources (HR), may register its components with the system dump facility during installation of the product. As one option, the OS 40 (FIG. 1A) vendor may provide (i.e., expose) an application programming interface (API) for third party vendors to register their product components with the system dump component. As another option, the third party vendor may register its product components with the system dump facility through a command line option (i.e., flag) of a well-known compiler.

At 200, as each component is loaded into memory 28 (FIG. 1A), the OS 40 (FIG. 1A) creates an entry 154 (FIG. 1B) for it in the component_text_range 152 table (FIG. 1A). The entry 154 (FIG. 1B) may include: a starting and an ending address range for where the component is loaded in memory (i.e., 000EF000-000EF900); an identifier for the component (i.e., specfs_id); a data collection function that is invoked to collect the system dump output (i.e., specfs_cdt_func); and a link (not shown), such as an address, pointing to other related components or subcomponents. The link may be used to locate components and subcomponents that should be transferred together if a system dump is requested, since these related components and subcomponents may not be loaded sequentially in system memory.

At 205, a system dump is invoked. In general, a system dump begins when a catastrophic event in hardware or software prevents the server 12 (FIG. 1A) from continuing normal operation. For example, in an instruction store interrupt (ISI), a component of the server 12 (FIG. 1A), such as the processing unit 16 (FIG. 1A), recognizes an exception when the address for an instruction access cannot be translated. Similarly, a data storage interrupt (DSI) exception is recognized when the address for a data access cannot be translated. Alternatively, a system dump may be manually invoked, for example, by a systems administrator.

At 210, specialized components in the server 12 (FIG. 1A), for example registers (not shown) in the processing unit 16 (FIG. 1A), track the instruction address, condition code, and other information that is used to control instruction sequencing and to determine the state of the server 12 (FIG. 1A). In cooperation with the specialized components, the OS 40 (FIG. 1A) may obtain the address of the failed instruction that triggered the system dump.

Using the failed instruction address, at 215 the OS 40 (FIG. 1A) may determine the failed system component by searching the component_text_range 152 (FIG. 1B) for an address range that contains the failed instruction address.

At 220, the OS 40 (FIG. 1A) begins transferring memory regions that are associated with the failed system component to a storage device, such as storage system 34 (FIG. 1A). These are the prioritized first memory regions. At 225 as long as there are still more memory regions associated with the identified failed component, the OS 40 (FIG. 1A) may continue transferring memory regions to the storage device. The transferred memory regions may include both memory regions associated with the identified failed component, as well as those associated with related components. For example, if the failed component is the logical volume manager (LVM), a related subcomponent may include the disk driver for the storage system 34 (FIG. 1A). At least enough of the LVM memory and the disk driver memory may be prioritized to be transferred to the storage device to indicate a cause of the component failure. The related component memory regions are the second priority memory regions. This prioritization of memory region collection may increase the likelihood that in case of a prematurely aborted system dump, the data for determining the root cause of the system failure is collected. Additionally, after the prioritized memory regions have been collected, the system may be restarted. This not only reduces system down time, but also saves storage device space, since only a fraction of the as much as "3" terabytes (TB) of the total system memory may be needed for root cause analysis.

The remainder of system memory is the third priority for transfer to the storage device. Having completed the transfer of the memory regions at 230, the OS 40 (FIG. 1A) may proceed to transfer the memory regions associated with the remaining components. In another embodiment, the system dump component may separately store diagnostic information related to the system failure, for example in a database or other similar data storage, for later analysis. The stored diagnostic information may at least include: an error code; the most recently called functions; and parameter values associated with the most recently called functions. Through statistical analysis and modeling, the failure symptom may be associated with a resolution, based on its likelihood of success. A measure of accuracy, i.e., success rate, for the resolution as applied to system failures having the identified characteristics may be calculated, thereby: generating several suggested resolutions in decreasing likelihood of success; improving product quality; and improving the efficiency and accuracy of customer support engineers.

Figure 3:
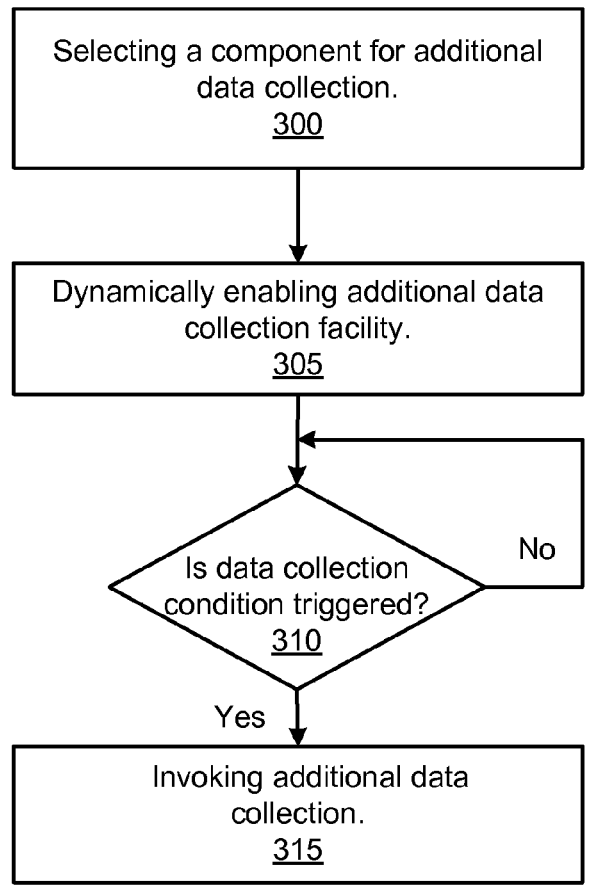
FIG. 3 is an operational flowchart illustrating an algorithm for a dynamic scalable system dump, according to various embodiments of the disclosure.

FIG. 3 depicts an exemplary embodiment of an algorithm for a dynamic scalable system dump, which may be practiced alone or in conjunction with the embodiment previously described in FIG. 2. As described previously with reference to FIG. 1A, the system dump facility collects the system memory environment in effect at the time of the system failure. However, enhanced diagnostic information may be collected, analyzed and presented in a format that may be more easily understood compared to system dump format.

At 300 an end user, such as a systems programmer, selects a component for additional data collection. For example, the user may select a component by its identifier from a list of components that are currently registered with the system dump facility, but should be included for additional data collection. Alternatively, the user may register the component with the OS 40 (FIG. 1A) for additional data collection, using an API provided by the OS 40 (FIG. 1A) vendor. The component registration may include at least: a component name; and a name of a function for the system dump and additional data collection facility to invoke. The named function may include: at least one condition to monitor, such as a particular error code, error severity, or value of a variable; at least one action to take upon a condition occurring, such as to collect specified data or abnormally terminate the component; and a location for writing the collection additional data, such as a file on a disk storage device. The system dump component may include the additional data collection facility. Optionally, the additional data collection facility may be implemented as a separate standalone program product. As another option, a server 12 (FIG. 1A) within the distributed computing environment may be configured and designated to perform the functions of a central dump server, as depicted and described with reference to FIG. 4.

At 305 the additional data collection facility is enabled through any one of several options that may be similar to registering a component for the system dump facility, including registering through: a vendor supplied API; a command line option (i.e., flag) of a well-known compiler; a dynamically executed script; and inclusion in the server 12 (FIG. 1A) boot process. The enabling command or script may include such parameters as: an identifier that is associated with the desired component to be monitored; a location for the output; and a level of detail to capture which may be dependent upon an error level severity.

The behavior of the additional data collection facility may be dynamically modified, through the parameters to the command, thereby providing a tool for use in diagnosing difficult to diagnose problems. For example, through multiple component failures, the user learns that a given failure always occurs after a certain I/O pattern. The user may dynamically invoke a function that collects associated memory buffers having characteristics that have been identified through analysis of previous data collection activities.

Once additional data collection is enabled, at 305 the named function monitors its component for an occurrence of the named condition. If at 310 the named condition does not occur, the monitoring continues. However, if the named condition occurs, at 315 the named function takes the action programmatically defined in the named function. When collected, the additional data may be stored for later analysis as diagnostic information related to the system failure. The stored diagnostic information may at least include: an error code; the most recently called functions; and parameter values associated with the most recently called functions. Through statistical analysis and modeling, the failure symptom may be associated with a resolution, based on its likelihood of success. A measure of accuracy, i.e., success rate, for the resolution as applied to system failures having the identified characteristics may be calculated, thereby: generating several suggested resolutions in decreasing likelihood of success; improving product quality; and improving the efficiency and accuracy of customer support engineers.

Figure 4:
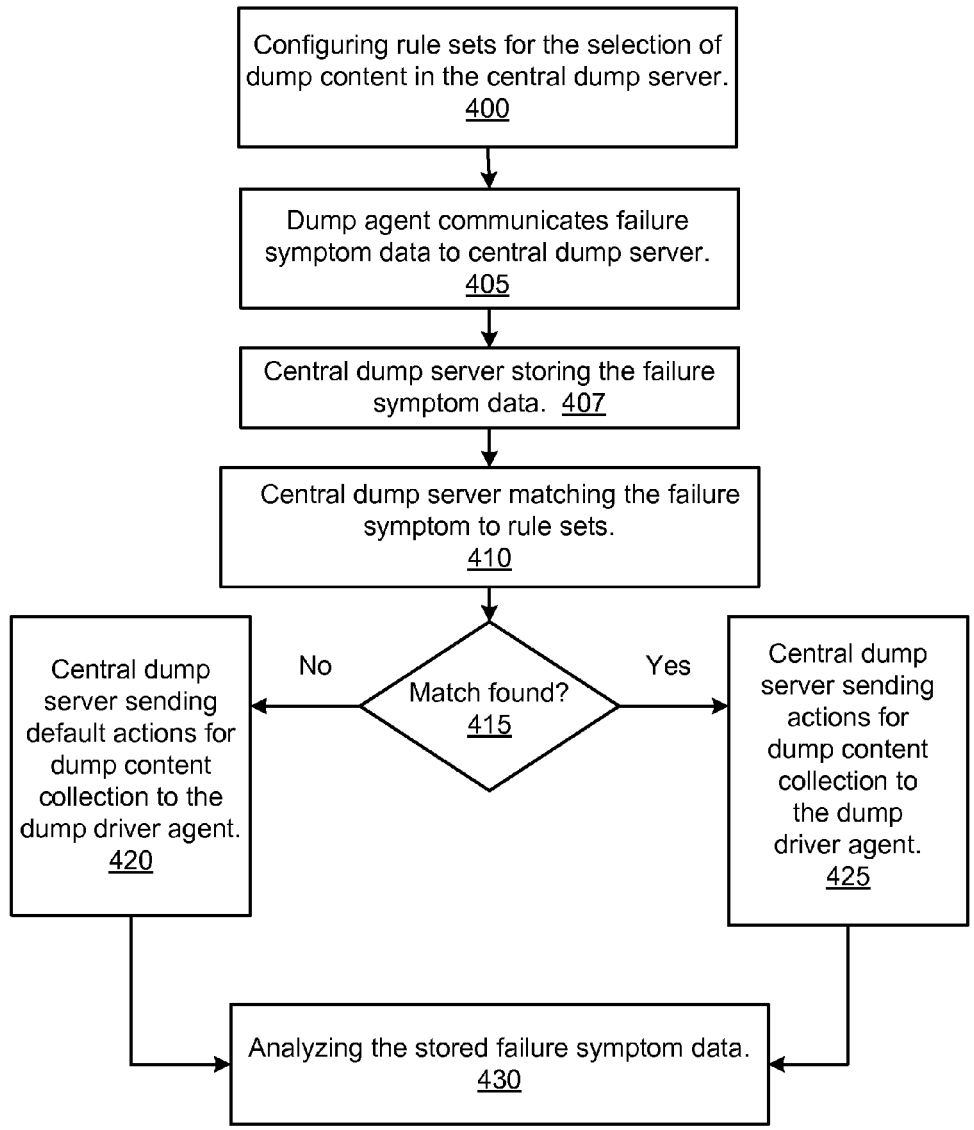
FIG. 4 is an operational flowchart illustrating the algorithm of FIG. 2 in cooperation with the algorithm of FIG. 3, according to various embodiments of the disclosure.

FIG. 4 illustrates an alternative embodiment for a scalable system dump facility that combines the algorithms of FIGS. 2 and 3. Although they may be practiced separately, the combined embodiments of prioritized system dump collection (FIG. 2) and additional data collection (FIG. 3) may increase efficiencies in system administration and problem determination when practiced together in distributed computing environments, such as a cloud configuration. A systems administrator manages the operation of the servers in the distributed computing environment from a server 12 (FIG. 1A) configured as an administration server. The administration server, or another server 12 (FIG. 1A) configured as a central dump server, may implement system dump management for all the servers 12 (FIG. 1A) in the distributed computing environment. In this embodiment, a dump driver agent may be included as a program module 42 (FIG. 1A) in each OS 40 (FIG. 1A) on each participating server in the distributed computing environment. In this configuration, the dump driver agent and the central dump server cooperate to perform the functions of the system dump component in the OS 40 (FIG. 1A). Each of the servers 12 (FIG. 1A) in a distributed computing environment may execute identical OS 40 (FIG. 1A) images. Therefore, efficiently capturing and diagnosing a system failure on a server may prevent the same system failure from repeating through the rest of the distributed computing environment, since once identified, the problem resolution may be deployed throughout the distributed computing environment.

In this configuration, registering the component dump handler, described previously with reference to FIG. 2, may now be managed by the central dump server, rather than by each individual OS 40 (FIG. 1A). For example, to diagnose a system failure reported by one of the servers 12 (FIG. 1A) in the distributed computing environment, a systems programmer may analyze the failure symptom from the system dump, and develop a data collection function to execute in the event of another similar system failure. The systems programmer may register the data collection function with the central dump server. The central dump server may deploy the data collection function to each server 12 (FIG. 1A) in the distributed computing environment.

At 400, the systems administrator configures the central dump server with sets of rules to prioritize the selection of the dump content that should be included in a system dump. The rule sets may be classified by failure symptom, including: an error code; an abnormal termination; and a deterioration in system performance. Additionally, each rule in the rule set may have an assigned priority or weight to ensure that at least the required data collection is performed in case the system dump is abnormally terminated.

As an example, a rule to select and prioritize data collection may apply to device driver failures. If an identified Small Computer System Interface (SCSI) device driver is in the system trace, then the rule may specify to collect all the outstanding I/O requests that are queued to the SCSI device. As another example, a rule may apply when a threshold number of CPUs in a server is waiting for the same lock. This condition may be difficult to diagnose since no system failure may result, and the only symptom may be gradually diminishing throughput in the server. Here, a statement of the rule may be to collect all thread structures in the server when this condition is recognized. A default data collection rule may be defined for each component when the failure symptom is unique (i.e., not found in existing rule sets).

At 405, when a system dump is required, the dump driver agent on the affected server may communicate the failure symptom data to the central dump server. The failure symptom data may include at least: an error code; the most recently called functions; and parameter values associated with the most recently called functions. The dump driver agent may communicate with the central dump server over a network, such as network 99 of FIG. 1A. Alternatively, the dump driver agent and central dump server may communicate by placing data messages in a shared storage or memory location.

In a further embodiment, at 407 the central dump server may store the failure symptom data from the dump driver agent, for example as a log entry or table entry in a database for further statistical analysis.

At 410, the central dump server searches its configured rule sets for a match to the failure symptom data sent by the dump driver agent. If at 415 a match is not found, then at 420 the central dump server may send the default actions, specified in the rule set, to the dump driver agent. The default may include transferring to the storage device: the processor registers; the state of the currently executing program or process; and the program stack pointer.

However, where a matching rule set is found, at 425, the central dump server communicates the data collection actions that are associated with the rule set, for example a sequence of data collection functions to execute, to the dump driver agent. In another embodiment, the central dump server may search the analyzed stored failure symptom data to determine whether a potential failure resolution is associated with the failure symptom that the dump driver agent reported. If so, the central dump server may take an action, such as notifying a systems administrator, or dynamically deploying maintenance updates.

At 430 another component of the central dump server, or another data analytics function, may evaluate the stored failure symptom data for several factors including: a statistical distribution of types of failures; a potential failure resolution; and a probability of success when applying the potential failure resolution. A measure of accuracy, i.e., success rate, for the resolution as applied to system failures having the identified characteristics may be calculated, thereby: generating several suggested resolutions in decreasing likelihood of success; improving product quality; and improving the efficiency and accuracy of customer support engineers.

Figure 5:
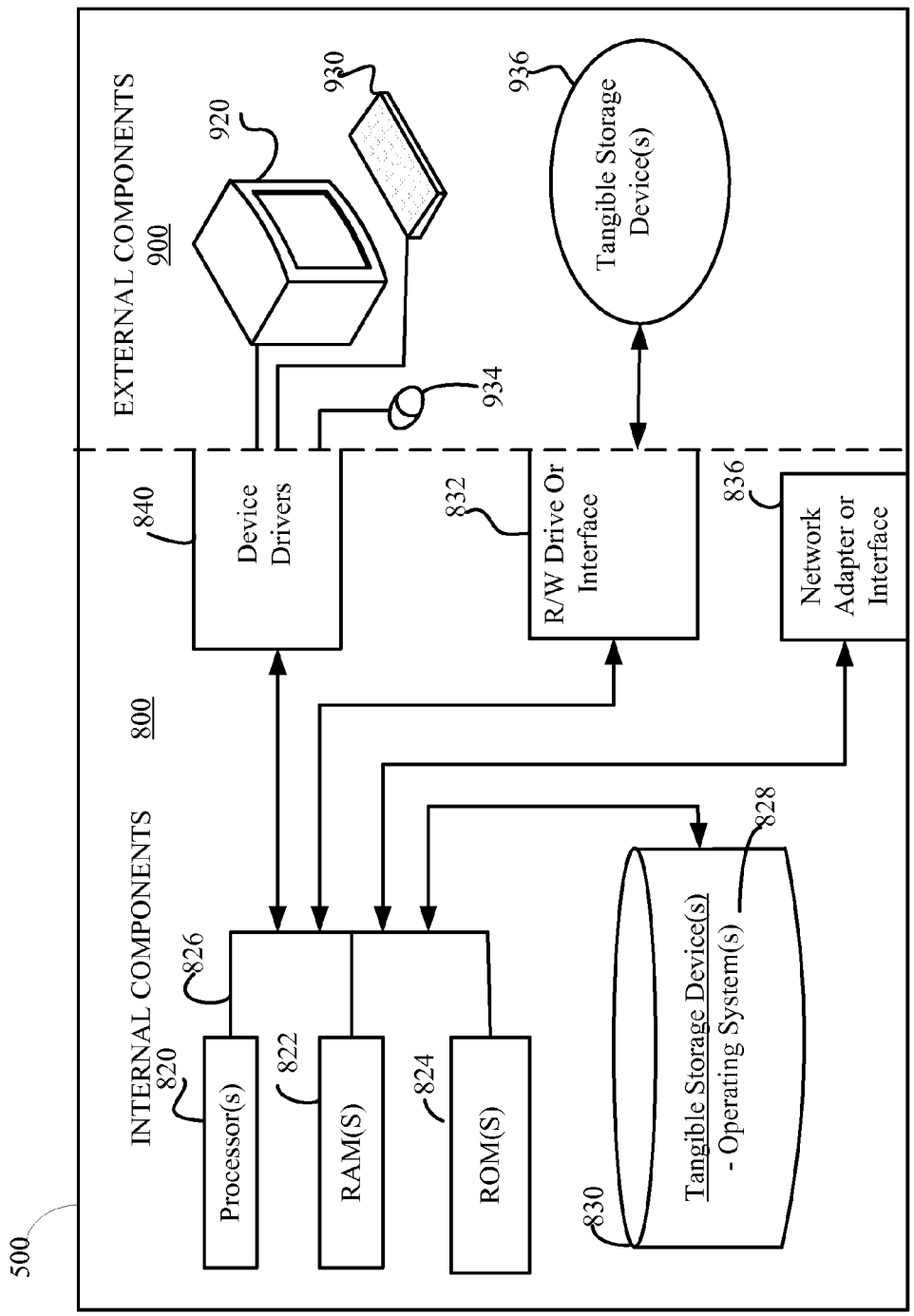
FIG. 5 is a schematic block diagram of hardware and software of the computer environment according to an embodiment of the processes of FIGS. 2-4.

Referring now to FIG. 5, computing device 500 may include respective sets of internal components 800 and external components 900 that together may provide an environment for a software application, such as the bid and exchange agents. Each of the sets of internal components 800 includes one or more processors 820; one or more computer-readable RAMs 822; one or more computer-readable ROMs 824 on one or more buses 826; one or more operating systems 828 executing the method of FIGS. 2-4; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 (including the additional data collection facility) that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for building a scalable system dump facility comprising:

loading a component into system memory, wherein the component includes a plurality of program modules;

creating a component text range table entry for each component, wherein the component text range table entry comprises: an address range, a component identifier, a data collection function, and a link to one or more related components;

responsive to invoking a system dump facility, determining a failing function, based on an address of a failing instruction;

searching the component text range table for an entry, wherein the address of the failing function is in the address range of the component text range table entry; and transferring a first number of memory regions to a storage device, based on the first number of memory regions being within the address range of the component text range table entry.

2. The method of claim 1, wherein transferring further comprises:

a first priority, wherein the first number of memory regions is transferred to the storage device;

a second priority, wherein a second number of memory regions is transferred to the storage device based on the second number of memory regions being linked with the one or more related components; and a third priority, wherein a remainder of memory regions is transferred to the storage device.

3. The method of claim 1, further comprising:

selecting the component for additional data collection;

registering a function to perform the additional data collection, wherein the function comprises:

at least one condition to monitor;

at least one action to perform, based on the at least one condition; and a location for writing the additional data collection;

enabling the additional data collection; and invoking the additional data collection, based on at least one of:
- a command line command;
- a command script;
- a compiler option; and
- a computer system boot option.

4. The method of claim 1, further comprising:

configuring at least one rule set, wherein the at least one rule set prioritizes transferring the plurality of memory regions associated with the address range to the storage device;

communicating, by a dump driver agent, a failure symptom data to a central dump server;

identifying, at the central dump server, at least one rule set, based on the failure symptom data matching the at least one rule set;

sending a default rule set to the dump driver agent, by the central dump server, based on the failure symptom data being unique; and sending the at least one rule set to the dump driver agent, by the central dump server, based on the failure symptom data matching the at least one rule set.

5. The method of claim 3, further comprising:

storing, by the central dump server, the failure symptom data communicated by the dump driver agent; and associating the failure symptom data with a potential problem resolution, based on analyzing the stored failure symptom data.

6. The method of claim 5, wherein the stored failure symptom data is analyzed to determine at least one of:
- a statistical distribution of a plurality of types of failures;
- the potential problem resolution associated with the stored failure symptom data;
- a probability of success that the potential problem resolution resolves the failure symptom; and
- a rate of success that the potential problem resolution resolves the failure symptom.

* * * * *